United States Patent
Wei et al.

(10) Patent No.: US 8,998,408 B2
(45) Date of Patent: Apr. 7, 2015

(54) ASYMMETRIC LENS DESIGN AND METHOD FOR PREVENTING AND/OR SLOWING MYOPIA PROGRESSION

(71) Applicant: Johnson & Johnson Vision Care, Inc., Jacksonville, FL (US)

(72) Inventors: Xin Wei, Jacksonville, FL (US); Noel A. Brennan, Jacksonville, FL (US); Khaled A. Chehab, Jacksonville, FL (US); Jeffrey H. Roffman, Saint Johns, FL (US); C. Benjamin Wooley, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 123 days.

(21) Appl. No.: 13/753,767

(22) Filed: Jan. 30, 2013

(65) Prior Publication Data

US 2014/0211147 A1    Jul. 31, 2014

(51) Int. Cl.
| | |
|---|---|
| *G02C 7/00* | (2006.01) |
| *G02C 7/02* | (2006.01) |
| *G02C 7/04* | (2006.01) |
| *G02C 7/06* | (2006.01) |

(52) U.S. Cl.
CPC ........ *G02C 7/041* (2013.01); *G02C 7/06* (2013.01); *G02C 7/04* (2013.01); *G02C 2202/24* (2013.01)

(58) Field of Classification Search
USPC ............ 351/159.05, 159.06, 159.48, 159.73, 351/159.79
See application file for complete search history.

(56) References Cited

U.S. PATENT DOCUMENTS

| | | | |
|---|---|---|---|
| 6,045,578 A | 4/2000 | Collins | |
| 2006/0232743 A1* | 10/2006 | Legerton | ................. 351/246 |
| 2011/0037944 A1 | 2/2011 | Varnas | |
| 2011/0051079 A1* | 3/2011 | Martinez et al. | ......... 351/160 R |

FOREIGN PATENT DOCUMENTS

| | | |
|---|---|---|
| EP | 2415425 A1 | 2/2012 |
| WO | WO 2005/055891 A1 | 6/2005 |
| WO | WO 2007/041796 A1 | 4/2007 |
| WO | WO 2008/131479 A1 | 11/2008 |
| WO | WO 2009/129528 A1 | 10/2009 |

OTHER PUBLICATIONS

European Search Report dated Apr. 4, 2014 for corresponding Application No. EP14153328.
Jenkins, T. C. A. (1963). Aberrations of the human eye and their effects on vision: part I. *British Journal of Physiological Optics*, 20, 59-91.
Stine, G. H. (1930). Variations in refraction of the visual and extravisual pupillary zones, American Journal of Ophthalmology, 13, 101-112.
Thibos, et al., (2004) Accuracy and precision of objective refraction from wavefront aberrations, Journal of Vision 4 (4), 329-351.
Report issued by the Intellectual Property Office of Singapore for Application No. 2014005706 dated May 9, 2014.

* cited by examiner

*Primary Examiner* — Scott J Sugarman
*Assistant Examiner* — Mustak Choudhury
(74) *Attorney, Agent, or Firm* — Carl J. Evens

(57) ABSTRACT

Contact lenses incorporating asymmetric radial power profiles that increase the radial dioptric power from the center to the margin of the optical zone of the lenses may be utilized to prevent and/or slow myopia progression. The power profiles vary along different meridians.

10 Claims, 10 Drawing Sheets

ASYMMETRIC LENS DESIGN AND METHOD FOR PREVENTING AND/OR SLOWING MYOPIA PROGRESSION

BACKGROUND OF THE INVENTION

1. Field of the Invention

The present invention relates to ophthalmic lenses, and more particularly, to contact lenses designed to slow, retard or prevent myopia progression. The ophthalmic lenses of the present invention comprise asymmetric radial power profiles that increase the radial dioptric power from the center to the margin of the optical zone of the lenses for preventing and/or slowing myopia progression.

2. Discussion of the Related Art

Common conditions which lead to reduced visual acuity are myopia and hyperopia, for which corrective lenses in the form of spectacles, or rigid or soft contact lenses, are prescribed. The conditions are generally described as the imbalance between the length of the eye and the focus of the optical elements of the eye, myopic eyes focusing in front of the retinal plane and hyperopic eyes focusing behind the retinal plane. Myopia typically develops because the axial length of the eye grows to be longer than the focal length of the optical components of the eye, that is, the eye grows too long. Hyperopia typically develops because the axial length of the eye is too short compared with the focal length of the optical components of the eye, that is, the eye does not grow enough.

Myopia has a high prevalence rate in many regions of the world. Of greatest concern with this condition is its possible progression to high myopia, for example greater than five (5) diopters, which dramatically affects one's ability to function without optical aids. High myopia is also associated with an increased risk of retinal disease, cataract, and glaucoma.

Corrective lenses are used to alter the gross focus of the eye to render a clearer image at the retinal plane, by shifting the focus from in front of the plane to correct myopia, or from behind the plane to correct hyperopia, respectively. However, the corrective approach to the conditions does not address the cause of the condition, but is merely prosthetic or symptomatic.

Most eyes do not have simple myopia or hyperopia, but have myopic astigmatism or hyperopic astigmatism. Astigmatic errors of focus cause the image of a point source of light to form as two mutually perpendicular lines at different focal distances. In the foregoing discussion, the terms myopia and hyperopia are used to include simple myopia or myopic astigmatism and hyperopia and hyperopic astigmatism respectively.

Emmetropia describes the state of clear vision where an object at infinity is in relatively sharp focus with the eye lens relaxed. In normal or emmetropic adult eyes, light from both distant and close objects and passing though the central or paraxial region of the aperture or pupil is focused by the crystalline lens inside the eye close to the retinal plane where the inverted image is sensed. It is observed, however, that most normal eyes exhibit a positive longitudinal spherical aberration, generally in the region of about +0.5 Diopters (D) for a 5 mm aperture, meaning that rays passing through the aperture or pupil at its periphery are focused +0.5 D in front of the retinal plan when the eye is focused to infinity. As used herein the measure D is the dioptric power, defined as the reciprocal of the focal distance of a lens or optical system, in meters. Also as utilized herein, the term "add" shall be defined as an additional plus power to assist in seeing more clearly at near distances.

The spherical aberration of the normal eye is not constant. For example, accommodation, that is, the change in optical power of the eye derived primarily though change to the internal crystalline lens causes the spherical aberration to change from positive to negative.

Emmetropisation is the process whereby eye growth is self-regulated to achieve an optimum match between the optics and axial length of the eye. Emmetropisation is responsible for the leptokurtosis apparent in refractive error distribution in humans and has been demonstrated to act in various animals to compensate for visual deprivation induced refractive errors. Juvenile-onset myopia is a common form of refractive error beginning in childhood and progressing up until the mid to late teens.

Whilst the length of the eye increases throughout life, growth is most pronounced during childhood. It has been observed that spherical aberration of the eye changes with age in children (Stine, 1930; Jenkins, 1963), from negative spherical aberration in children younger than about 6 years of age when focused on distant objects, to positive spherical aberration at about 6-7 years of age. Most adults display positive spherical aberration of the eye focused at infinity for the remainder of their lives.

U.S. Pat. No. 6,045,578 discloses a method of altering the focus of the eye, including changing the spherical aberration of the ocular system by a direction and degree related to alter the growth in eye length, in other words emmetropisation may be regulated by spherical aberration. In this process, the cornea of a myopic eye is fitted with a lens having its outer surface formed having increasing dioptric power away from the lens center. Paraxial light rays entering the central portion of the lens are focused on the retina of the eye, producing a clear image of an object. Marginal light rays entering the peripheral portion of the cornea are focused in a plane between the cornea and the retina, and produce positive spherical aberration of the image on the latter. This positive spherical aberration produces a physiological effect on the eye which tends to inhibit growth of the eye, thus mitigating the tendency for the myopic eye to grow longer. The higher the spherical aberration, the more profound is the effect on myopia progression. However, increases in the magnitude of the effective add power of the contact lens tends to worsen foveal vision.

Accordingly, there exists a need to improve distance vision correction and/or create a larger effective add power in contact lenses while preventing and/or slowing myopia progression via the introduction of positive aberration while maintaining good foveal vision.

SUMMARY OF THE INVENTION

The asymmetric lens design of the present invention overcomes the limitations of the prior art by ensuring better distance vision correction with a higher effective add power in the lens.

In accordance with one aspect, the present invention is directed to an ophthalmic lens for at least one of slowing, retarding or preventing myopia progression. The ophthalmic lens comprises an optic zone configured with a positive asymmetric aberration for creating a physiological effect on the eye, the positive asymmetric aberration including asymmetric radial power profiles with increasing dioptric power from a center to a margin of the optic zone and wherein the asymmetric radial power profiles are variable along different radial meridians, and a peripheral zone surrounding the optic zone.

In accordance with another aspect, the present invention is directed to a method for at least one of slowing, retarding or preventing myopia progression by altering the focus of the eye by a direction and degree to alter the growth of the eye. The method comprises introducing asymmetric radial power profiles with increasing dioptric power from a center to a margin of an optical zone of an ophthalmic lens and varying the asymmetric radial power profiles along different radial meridians.

The contact lens of the present invention is designed with increasing dioptric power from the geometric center to the margin of the optical zone of the contact lens, and these powers are varied along different meridians. As set forth herein, it has been shown that positive spherical aberration produces a physiological effect on the eye which tends to inhibit growth of the eye, thus mitigating the tendency for the myopic eye to grow longer. The contact lens design of the present invention provides a larger effective add power in the regions of the lens that will tend to have the most significant impact on eye physiology relative to myopia progression. It is also known that higher magnitude spherical aberration increases the effect on slowing, retarding or preventing myopia progression, but at higher levels, negatively affects visual acuity. Accordingly, the present invention utilizes asymmetric aberration to significantly increase the effective add power while maintaining reasonably good foveal correction due to the fact that visual acuity is less sensitive to asymmetric aberration. The lens of the present invention may also be customized to achieve both good foveal vision correction and higher treatment efficacy based on the subject eyes' average pupil size.

The contact lens design of the present invention provides a simple, cost-effective and efficacious means and method for preventing and/or slowing myopia progression which is increasing throughout the world at an increasing rate.

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE PREFERRED EMBODIMENTS

Figure 1:
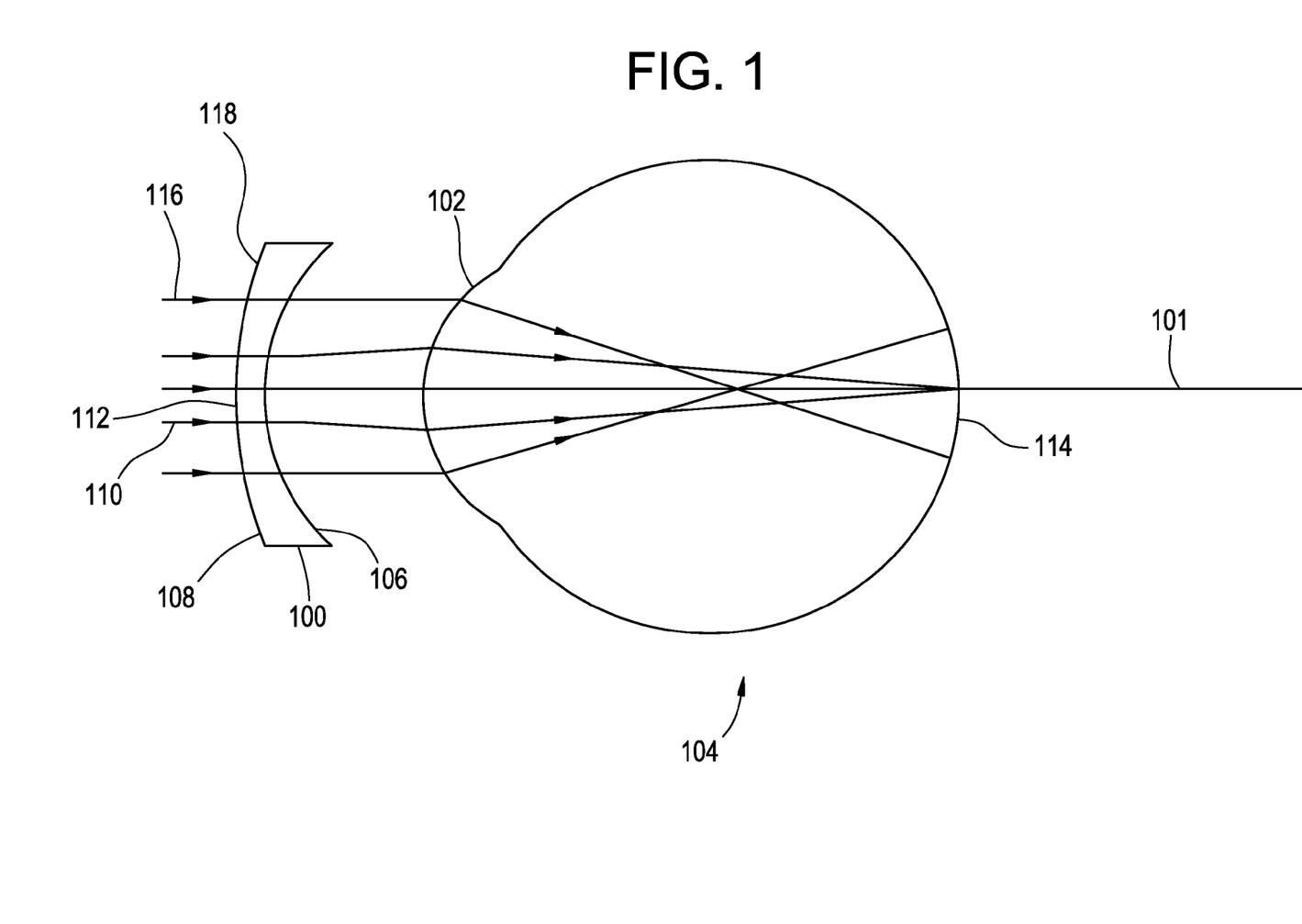
FIG. 1 is a diagrammatic illustration of a contact lens and eye optic system in accordance with the prior art.

It has been shown that positive spherical aberration produces a physiological effect on the eye which tends to inhibit growth of the eye, thus mitigating the tendency for the myopic eye to grow longer. FIG. 1 illustrates a prior art lens 100 which introduces positive spherical aberration in the peripheral region. The convex cornea 102 of a myopic eye 104 has been fitted with a lens 100 having its inner surface 106 formed spherically and its outer surface 108 formed as part of an ellipsoid having increasing dioptric power, that is, decreasing radius of curvature, away from the axis 101 of the lens 100 and cornea 102, that is, an oblate ellipsoid. Paraxial light rays 110 entering the central portion 112 of the lens 100 are focused on the retina 114 of the eye 104, producing a clear image of an object. Marginal light rays 116 entering the peripheral portion 118 of the lens 100 and passing to the cornea 102 are focused in a plane between the cornea 102 and the retina 114, and produce positive spherical aberration of the image on the later. This positive spherical aberration produces a physiological effect on the eye which tends to inhibit growth of the eye, thus mitigating the tendency of the myopic eye to grow longer.

The present invention is directed to a lens design that provides a larger effective add power in the regions of the lens that will tend to have the most significant impact on eye physiology relative to myopia progression while providing similar or better distance vision correction to the prior art. The prior art lens utilizes symmetric positive spherical aberration which does in fact have an effect on myopia progression. It is also known that higher magnitude spherical aberration increases the effect on myopia progression but at higher levels, negatively effects visual acuity. The present invention utilizes asymmetric aberration to significantly increase the effective add power while maintaining reasonably good foveal correction due to the fact that visual acuity is less sensitive to asymmetric aberration.

Accordingly, the present invention is directed to a lens designed with increasing dioptric power from the center to the margin of the optical zone of the lens and with such power profiles that vary along different meridians. In particular, to match the entrance pupil size for the pediatric population, for example, the diameter of the above mentioned optical zone is between 2 mm and 11 mm. To maximize treatment efficacy for slowing myopia progression and to optimize foveal vision correction, the dioptric power differential between the center and the margin of the optical zone is preferably between 0.5 D and 25.0 D for different meridians.

In accordance with one exemplary embodiment, the asymmetric power profiles may be described by $$P(r,\theta)=\Sigma_{i=0}^{\infty}C_i(\theta)r^{2i}, \qquad (1)$$

where r represents the radial distance from the geometric lens center, 2i represents degrees of polynomial terms, $C_i(\theta)$ represents the coefficient of specific polynomial terms and is a function of $\theta$, $\theta$ represents the angle between a specific meridian and a reference axis, for example, the x-axis (horizontal axis) in Cartesian coordinates, and $P(r, \theta)$ defines the radial power of an optical design. It is important to note that other power profiles may be utilized, for example step functions, ramp functions and/or any other curves; however, with equation (1), $C_i(\theta)$ is manipulated or varied to satisfy vision correction and provide good treatment efficacy to slowing the progression of myopia. To measure vision correction, neural sharpness at 4.5 EP (entrance pupil) and 6.5 EP is utilized as a determinant of retinal image quality. Once again it is important to note that any other suitable means and/or method, for example, area of the MTF curve, strehl ratio, that measures the goodness of retinal image quality may be utilized. Neural sharpness is given by $$NS = \frac{\int_{-\infty}^{\infty}\int_{-\infty}^{\infty} psf(x,y)g_N(x,y)dxdy}{\int_{-\infty}^{\infty}\int_{-\infty}^{\infty} psf_{DL}(x,y)g_N(x,y)dxdy}, \quad (2)$$

where psf or point-spread function is the image of a point object and is calculated as the squared magnitude of the inverse Fourier transform of the pupil function P(X,Y) where P(X,Y) is given by $$P(X,Y)=A(X,Y)\exp(ikW(X,Y)), \quad (3)$$

where k is the wave number ($2\pi$/wavelength) and A(X, Y) is an optical apodization function of pupil coordinates X, Y, $psf_{DL}$ is the diffraction-limited psf for the same pupil diameter, and $g_N$ (X, Y) is a bivariate-Gaussian, neural weighting function. For a more complete definition and calculation of neural sharpness see "Accuracy and precision of objective refraction from wave front aberrations," Larry N. Thibos et al., Journal of Vision (2004) 4, 329-351, which discusses the problem of determining the best correction of an eye utilizing wave front aberrations. The wave front of the contact lens and the eye is the sum of each as given by $$W_{CL+eye}(X,Y)=W_{CL}(X,Y)+W_{eye}(X,Y). \quad (4)$$

To predict treatment efficiency requires a calculation of the magnitude of the spherical aberration. In the presence of both lower and higher order spherical aberration, the effective add power is a better measure to indicate spherical aberration. Effective add power is given by power_add=average_power(outer zone)−
average_power(inner zone), (5)

wherein the selection of the size of the inner zone and the outer zone is generic.

Figure 7:
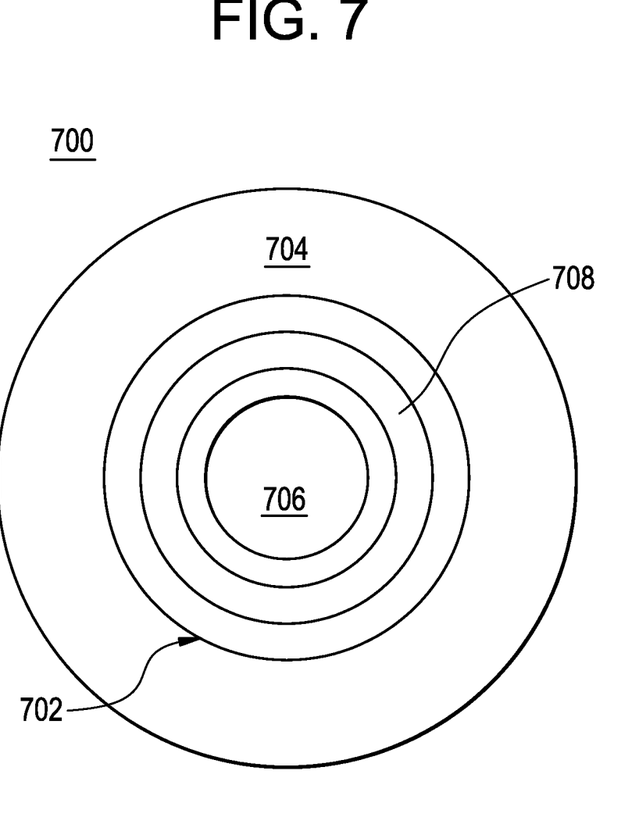
FIG. 7 is a diagrammatic representation of an exemplary contact lens in accordance with the present invention.

Referring to FIG. 7, there is illustrated a diagrammatic view of a contact lens 700 in accordance with the present invention. The contact lens 700 comprises an optic zone 702 and a peripheral zone 704. The optic zone 702 comprises an inner zone 706 and an outer zone 708. In the following examples, the diameter of the optic zone 702 is selected to be 8 mm, the diameter of the substantially circular inner zone 706 is selected to be 4 mm, and the boundary diameters of the annular outer zone 708 are 5 mm and 6.5 mm as measured from the geometric center of the lens 700. It is important to note that FIG. 7 only illustrates an exemplary embodiment of the present invention. For example, in this exemplary embodiment, the outer boundary of the outer zone 708 does not necessarily coincide with the outer margin of the optic zone 702, whereas in other exemplary embodiments, they may coincide. The peripheral zone 704 surrounds the optic zone 702 and provides standard contact lens features, including lens positioning and centration. In accordance with one exemplary embodiment, the peripheral zone 704 may include one or more stabilization mechanisms to reduce lens rotation when on eye.

It is important to note that the various zones in FIG. 7 are illustrated as concentric circles, the zones may comprise any suitable round or non-round shapes such as an elliptical shape. For example, in exemplary embodiments having a radial power distribution at some distance from the axis, the optic region would probably have an elliptical shape.

Figure 2A:
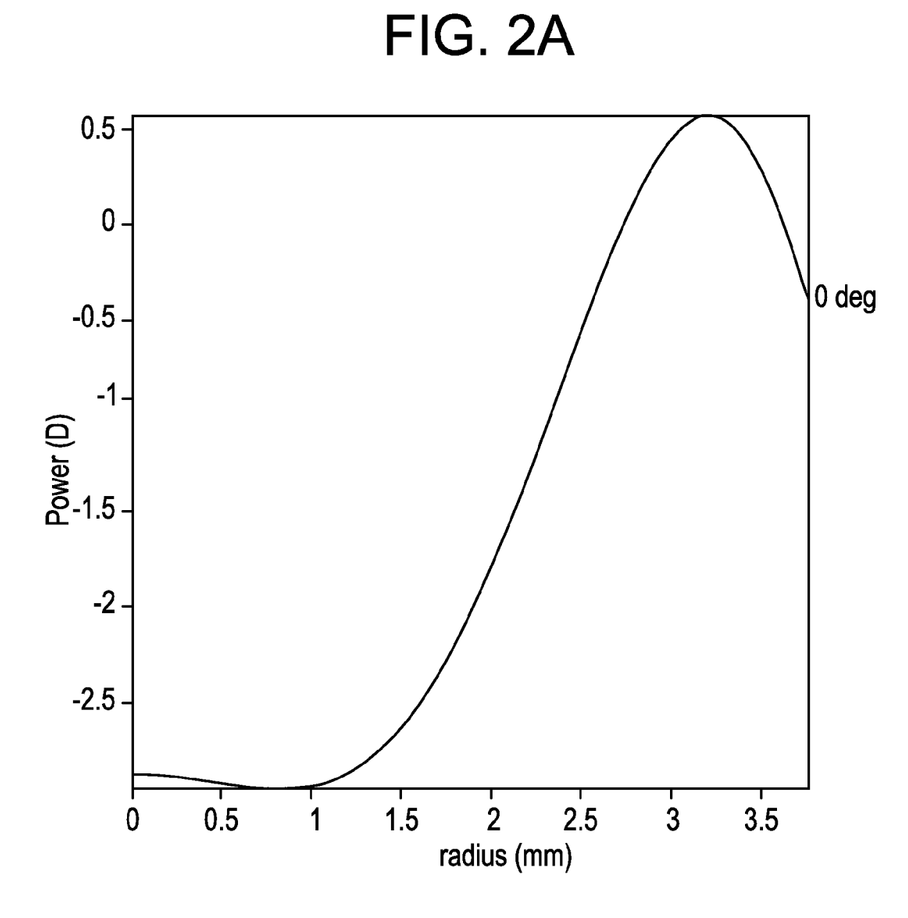
FIGS. 2A and 2B illustrate the power profiles for the first symmetric design and the first asymmetric design in accordance with the present invention.
Figure 2B:
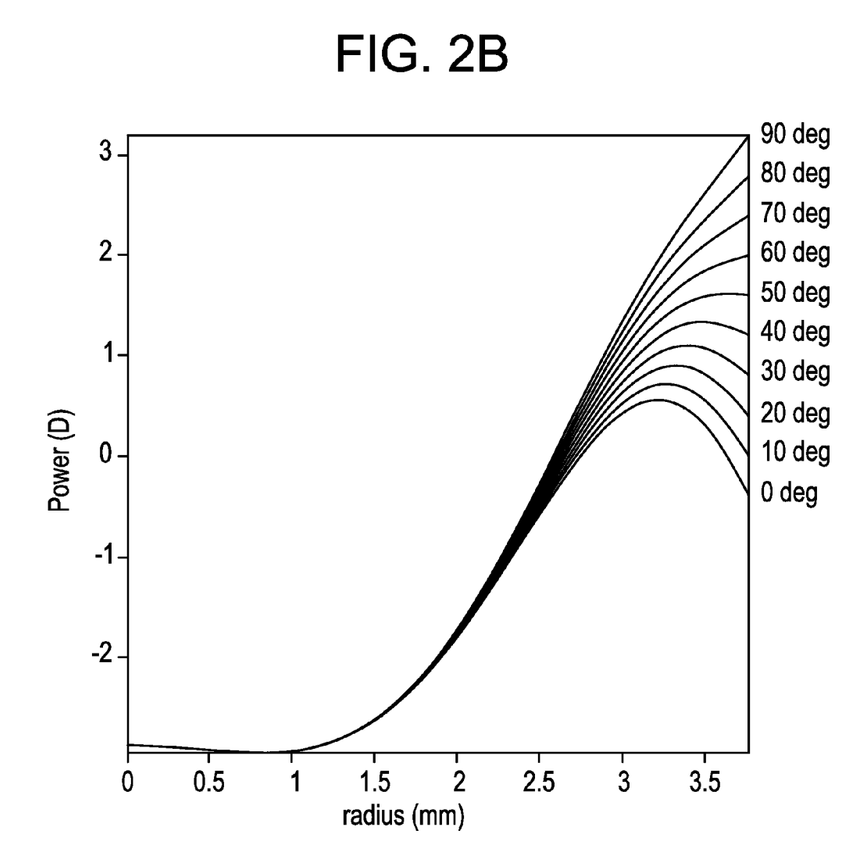

Table 1 below summarizes the results for a first asymmetric design, ASY100, versus a first symmetric design SYM100, for neural sharpness and effective add power with inputs $C_0(\theta)$, $C_1(\theta)$, $C_2(\theta)$, $C_3(\theta)$ and $C_4(\theta)$ in equation (1). FIGS. 2A and 2B illustrate the power profiles for the first symmetric design and the first asymmetric design respectively. As may be seen from the data in the Table, an effective add power of 3.19 D for the asymmetric design versus and effective add power of 2.80 D for the symmetric design may be achieved with similar results for the neural sharpness metric when $C_3(\theta)=-0.02+1.42e^{-5}\,\theta$. Accordingly, a higher effective add power is achievable with this design with no impact on visual acuity.

TABLE 1

| DESIGN | SYM 101 | ASY 100 |
| --- | --- | --- |
| NS 4.5 | −0.90 | −0.90 |
| NS 6.5 | −1.64 | −1.65 |
| ADD P | 2.80 D | 3.19 D |
| $C_0(\theta)$ | −2.88 | −2.88 |
| $C_1(\theta)$ | −0.23 | −0.23 |
| $C_2(\theta)$ | 0.19 | 0.19 |
| $C_3(\theta)$ | −0.02 | $-0.02 + 1.42e^{-5}\,\theta$ |
| $C_4(\theta)$ | 0.00 | 0.00 |

Figure 3A:
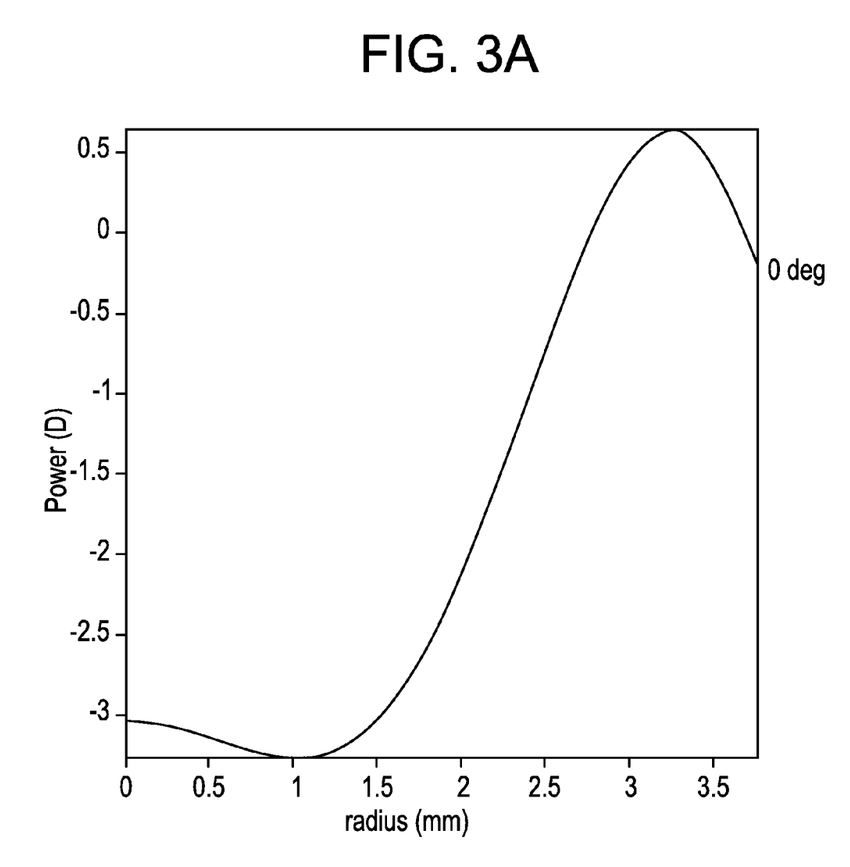
FIGS. 3A and 3B illustrate the power profiles for the second symmetric design and the second symmetric design in accordance with the present invention.
Figure 3B:
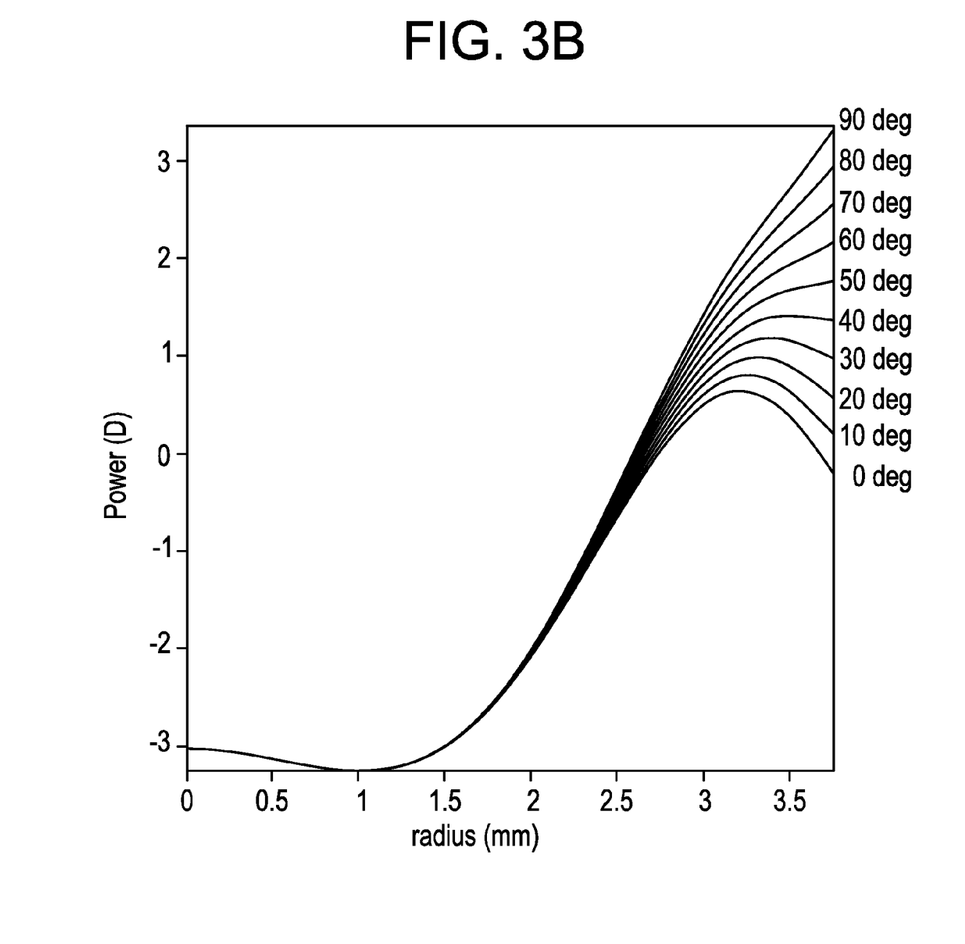

Table 2 below summarizes the results for a second asymmetric design, ASY 101, versus a symmetric design, SYM101, for neural sharpness and effective add power with inputs $C_0(\theta)$, $C_1(\theta)$, $C_2(\theta)$, $C_3(\theta)$ and $C_4(\theta)$ in equation (1). FIGS. 3A and 3B illustrate the power profiles for the second symmetric design and the second asymmetric design respectively. As may be seen from the data in the Table, an effective add power of 3.54 D for the asymmetric design versus an effective add power of 3.15 D for the symmetric design may be achieved with similar results for the neural sharpness metric when $C_0(\theta)=-0.02+1.42e^{-5}\,\theta$. Accordingly, a higher effective add power is achievable with this design with no impact on visual acuity.

TABLE 2

| DESIGN | SYM100 | ASY101 |
| --- | --- | --- |
| NS 4.5 | −0.82 | −0.83 |
| NS 6.5 | −1.56 | −1.57 |
| ADD P | 3.15 D | 3.54 D |
| $C_0(\theta)$ | −3.02 | −3.02 |
| $C_1(\theta)$ | −0.47 | −0.47 |
| $C_2(\theta)$ | 0.27 | 0.27 |
| $C_3(\theta)$ | −0.02 | $-0.02 + 1.42e^{-5}\,\theta$ |
| $C_4(\theta)$ | 0.00 | 0.00 |

Figure 4:
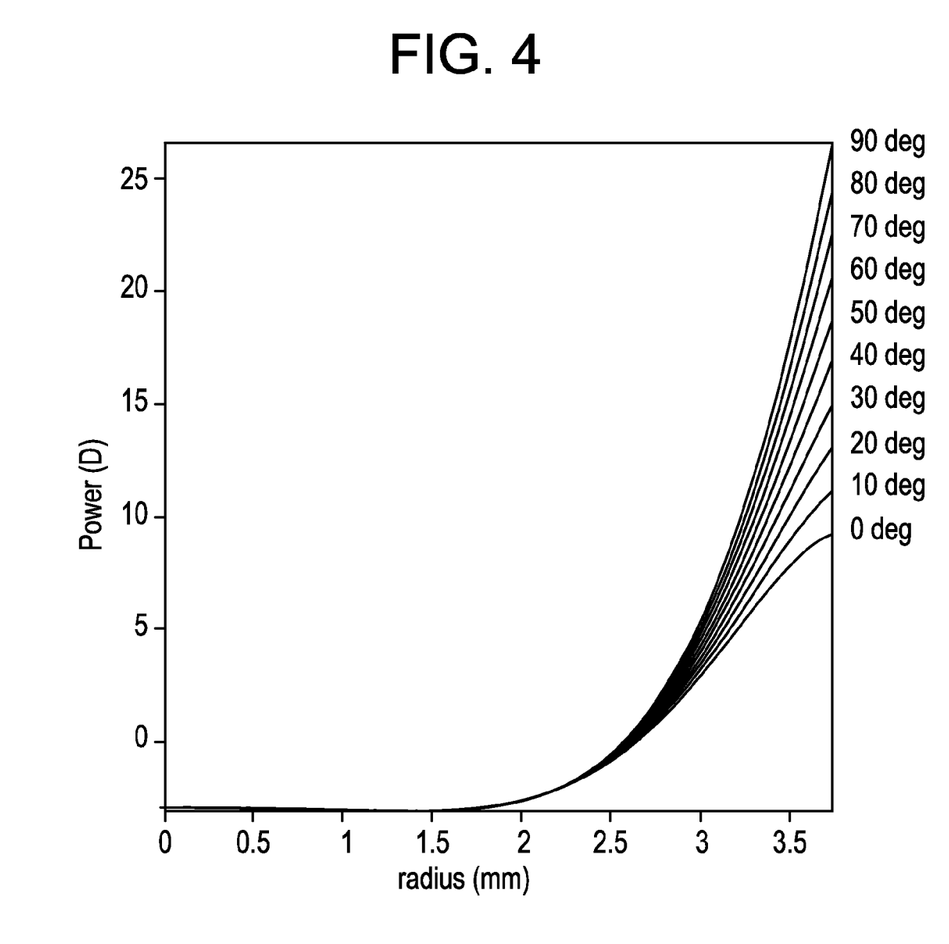
FIG. 4 illustrates the power profile for the third asymmetric design in accordance with the present invention.

Table 3 below summarizes the results for a third asymmetric design, ASY102, versus first and second symmetric designs SYM100 and SYM101 for neural sharpness and effective add power with inputs $C_0(\theta)$, $C_1(\theta)$, $C_2(\theta)$, $C_3(\theta)$ and $C_4(\theta)$ in equation 1. FIG. 4 illustrates the power profile for the third asymmetric design. As may be seen from the data in the Table, an effective add power of 6.00 D may be achieved with this asymmetric design with better results for the neural sharpness metric when $C_0(\theta)$-$C_4(\theta)$ are varied as set forth therein. Accordingly, a significantly higher effective add power is achievable with this design with an improvement in visual acuity.

TABLE 3

| DESIGN | SYM100 | SYM101 | ASY102 |
| --- | --- | --- | --- |
| NS 4.5 | −0.90 | −0.82 | −0.32 |
| NS 6.5 | −1.64 | −1.56 | −1.07 |

TABLE 3-continued

| DESIGN | SYM100 | SYM101 | ASY102 |
|---|---|---|---|
| ADD P | 2.75 D | 3.04 D | 6.00 D |
| $C_0(\theta)$ | −2.88 | −3.02 | −2.91 |
| $C_1(\theta)$ | −0.23 | −0.47 | $-0.11 + 3.90e^{-4}\,\theta$ |
| $C_2(\theta)$ | 0.19 | 0.27 | $-0.02 - 2.76e^{-4}\,\theta$ |
| $C_3(\theta)$ | −0.02 | −0.03 | $0.02 + 1.66e^{-5}\,\theta$ |
| $C_4(\theta)$ | 0.00 | 0.00 | $-0.00 + 5e^{-6}\,\theta$ |

Figure 5:
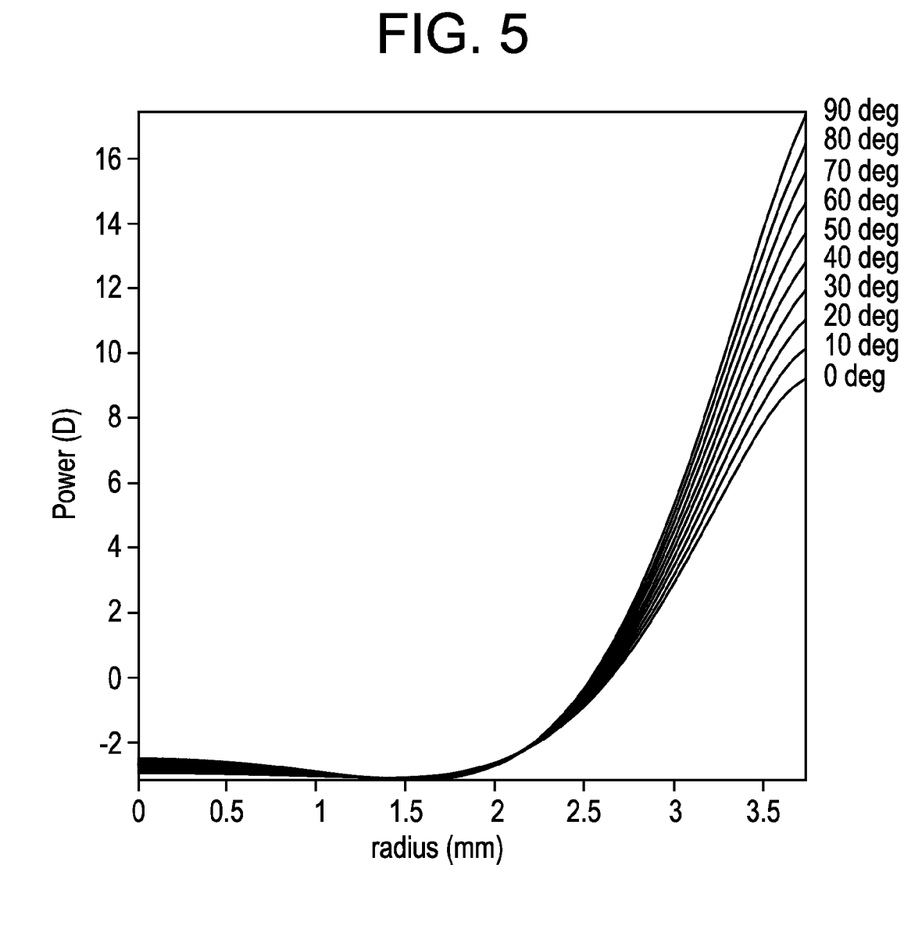
FIG. 5 illustrates the power profile for this fourth asymmetric design in accordance with the present invention.

Table 4 below summarizes the results for a fourth asymmetric design, ASY 103, versus first and second symmetric designs SYM100 and SYM101 for neural sharpness and effective add power with inputs $C_0(\theta)$, $C_1(\theta)$, $C_2(\theta)$, $C_3(\theta)$ and $C_4(\theta)$ in equation 1. FIG. 5 illustrates the power profile for the fourth asymmetric design. As may be seen from the data in the Table, an effective add power of 6.00 D may be achieved with this asymmetric design with similar results for the neural sharpness metric as compared to the third asymmetric design when $C_0(\theta)$-$C_4(\theta)$ are varied as set forth therein. Accordingly, a significantly higher effective add power is achievable with this design with an improvement in visual acuity.

TABLE 4

| DESIGN | SYM100 | SYM101 | ASY103 |
|---|---|---|---|
| NS 4.5 | −0.90 | −0.82 | −0.35 |
| NS 6.5 | −1.64 | −1.56 | −1.10 |
| ADD P | 2.75 D | 3.04 D | 6.00 D |
| $C_0(\theta)$ | −2.88 | −3.02 | $-2.91 + 0.0049\,\theta$ |
| $C_1(\theta)$ | −0.23 | −0.47 | $-0.11 - 0.0038\,\theta$ |
| $C_2(\theta)$ | 0.19 | 0.27 | $-0.02 + 3.68e^{-4}\,\theta$ |
| $C_3(\theta)$ | −0.02 | −0.03 | $0.02 + 5.63e^{-5}\,\theta$ |
| $C_4(\theta)$ | 0.00 | 0.00 | $-0.00 - 2.31e^{-6}\,\theta$ |

The modulation transfer function (MTF) is a tool for the objective estimation of the image forming capability of an optical system, for example, the eye. The higher the MTF curve, the better the image correction an optical system will carry. In addition, since every naturally occurring scene that the human eye sees can be decomposed (Fourier analysis) into linear combinations of gratings at different directions and frequencies, the MTF can also be utilized to indicate the image quality correction for visual signals at different directions. Accordingly, one has a tangential or horizontal MTF that characterizes the quality of image correction for horizontal gratings, and sagittal or vertical MTF that characterizes the quality of image correction for vertical gratings. Graphical representations are illustrated and discussed subsequently in a comparison between the fourth asymmetric design, ASY103, and a fifth asymmetric design set forth below.

Table 5 below summarizes the results for a fifth asymmetric design, ASY104, versus the fourth asymmetric design for the neural sharpness metric and effective add power with inputs $C_0(\theta)$, $C_1(\theta)$, $C_2(\theta)$, $C_3(\theta)$ and $C_4(\theta)$ in equation 1. As may be seen from the data in the Table, an effective add power of 6.00 D may be achieved with this asymmetric design with identical results for the neural sharpness metric when $C_0(\theta)$-$C_4(\theta)$ are varied as set forth therein. What differs in the two designs may be seen from the MTF curves in FIGS. 6A and 6B.

TABLE 5

| DESIGN | ASY103 | ASY104 |
|---|---|---|
| NS 4.5 | −0.35 | −0.35 |
| NS 6.5 | −1.10 | −1.10 |
| ADD P | 6.0 D | 6.00 D |
| $C_0(\theta)$ | $-2.91 + 0.0049\,\theta$ | $-2.91 + 0.0049\,(\theta\text{-}90)$ |
| $C_1(\theta)$ | $-0.11 - 0.0038\,\theta$ | $-0.11 - 0.0038\,(\theta\text{-}90)$ |
| $C_2(\theta)$ | $-0.02 + 3.68e^{-4}\,\theta$ | $-0.02 + 3.68e^{-4}\,(\theta\text{-}90)$ |
| $C_3(\theta)$ | $0.02 + 5.68e^{-5}\,\theta$ | $0.02 + 5.63e^{-5}\,(\theta\text{-}90)$ |
| $C_4(\theta)$ | $-0.00 - 2.31e^{-6}\,\theta$ | $-0.00 - 2.31e^{-6}\,(\theta\text{-}90)$ |

Figure 6A:
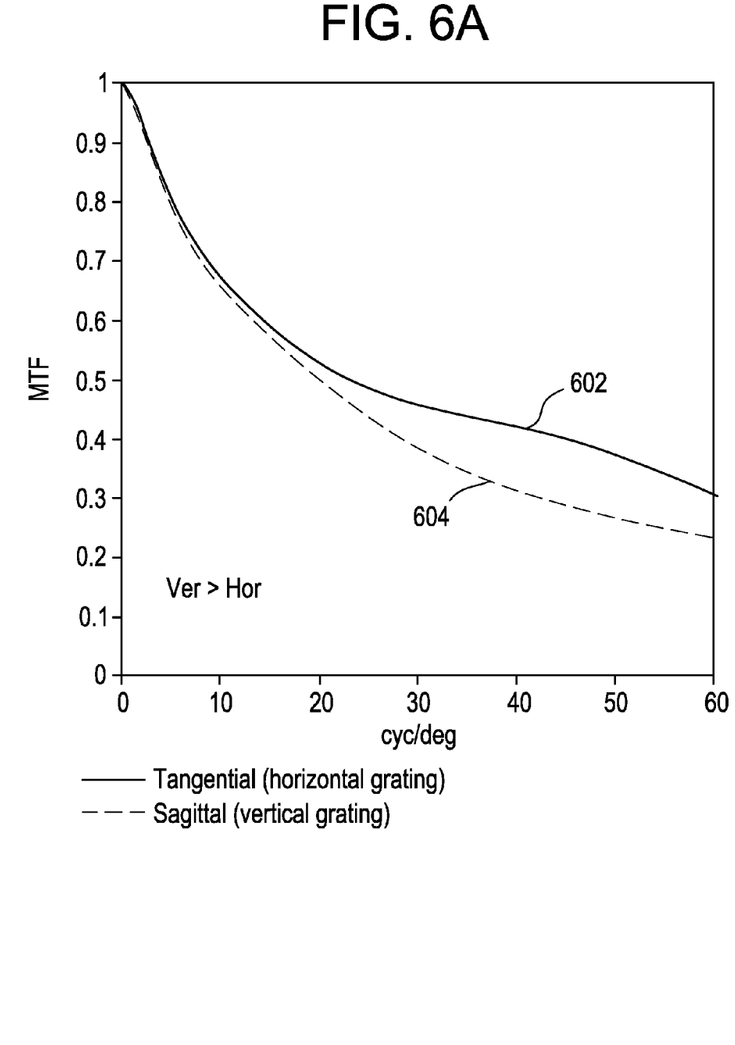
FIG. 6A illustrates the MTF curves for the fourth asymmetric design in accordance with the present invention.
Figure 6B:
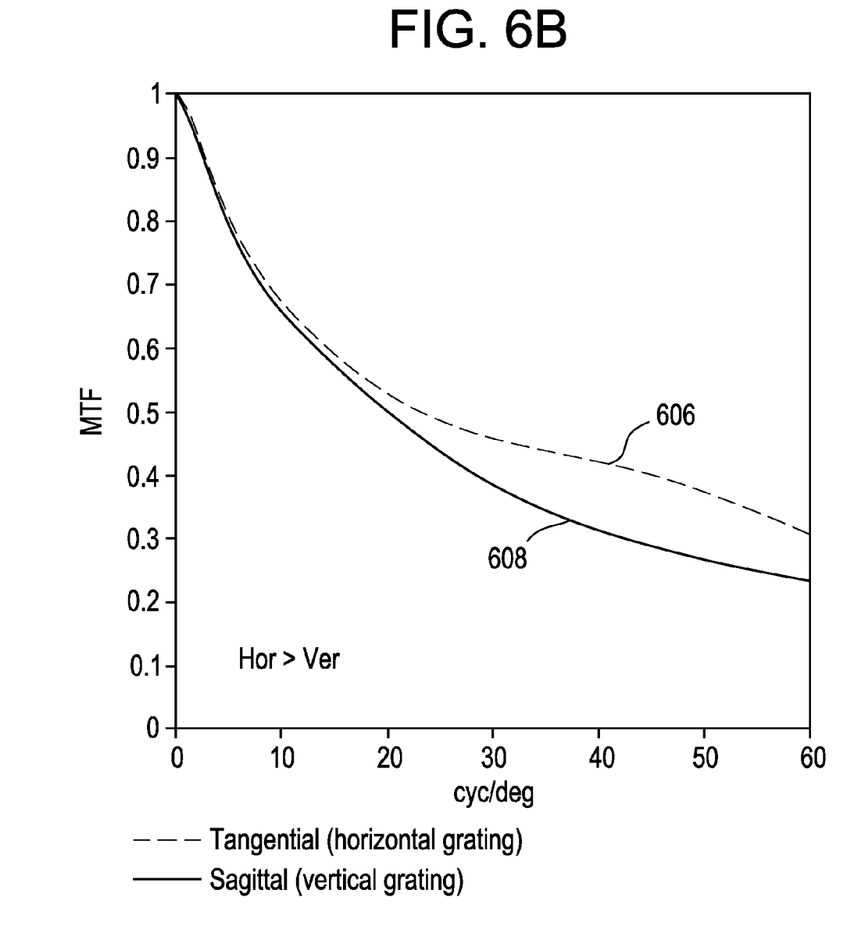
FIG. 6B illustrates the MTF curves for the fifth asymmetric design in accordance with the present invention.

FIG. 6A illustrates the MTF curves for the fourth asymmetric design with the curve for vertical gratings 602 being greater than the curve for horizontal gratings 604. FIG. 6B illustrates the MTF curves for the fifth asymmetric design with the curve for horizontal gratings 606 being greater than the curve for vertical gratings 608. What this means is that for the fourth asymmetric design there is worse image quality for horizontal visual signals than for vertical signals, whereas for the fifth asymmetric design there is worse image quality for vertical visual signals than for horizontal signals. For myopia control purposes, worse image quality correction implies better treatment efficacy. Therefore, for situations like reading English language books where horizontal signals dominate, the fourth asymmetric design is more effective. Similarly, for situations like reading certain Asian scripts where vertical signals dominate, the fifth asymmetric design is more effective. The fifth design is simply the fourth design rotated by ninety (90) degrees and is given by the equation $$P(r,\theta,\propto) = \Sigma_{i=0}^{\infty} C_i(\theta - \propto) r^{2i}, \qquad (6)$$

where all the variables are the same as equation (1) and $\propto$ is the angle between the reference axis and x-axis (horizontal axis) in Cartesian coordinates. The selection of $\propto$ depends on daily visual experiences and amistrophy in the vision system. In other words, the power profiles may be rotated by any angle corresponding to the directional dominance of the visual scene.

It is important to note that as the entrance pupil size of the eye varies among the pediatric subpopulation, in certain exemplary embodiments, the lens design may be customized to achieve both good foveal vision correction and large treatment efficacy based on the patient's eyes' average pupil size. Moreover, as pupil size correlates with refraction and age for pediatric patients, in certain exemplary embodiments, the lens may be further optimized towards subgroups of the pediatric subpopulation with specific age and/or refraction based upon their pupil sizes. Essentially, the power profiles may be adjusted or tailored to pupil size to achieve an optimal balance between foveal vision correction and effective add power.

Currently available contact lenses remain a cost effective means for vision correction. The thin plastic lenses fit over the cornea of the eye to correct vision defects, including myopia or nearsightedness, hyperopia or farsightedness, astigmatism, i.e. asphericity in the cornea, and presbyopia i.e. the loss of the ability of the crystalline lens to accommodate. Contact lenses are available in a variety of forms and are made of a variety of materials to provide different functionality. Daily wear soft contact lenses are typically made from soft polymer materials combined with water for oxygen permeability. Daily wear soft contact lenses may be daily disposable or extended wear disposable. Daily disposable contact lenses are usually worn for a single day and then thrown away, while extended wear disposable contact lenses are usually worn for a period of up to thirty days. Colored soft contact lenses use different materials to provide different functionality. For example, a visibility tint contact lens uses a light tint to aid the wearer in locating a dropped contact lens, enhancement tint contact lenses have a translucent tint that is meant to enhance one's natural eye color, the color tint contact lens comprises a darker, opaque tint meant to change one's eye color, and the light filtering tint contact lens functions to enhance certain colors while muting others. Rigid gas permeable hard contact lenses are made from siloxane-containing polymers but are more rigid than soft contact lenses and thus hold their shape and are more durable. Bifocal contact lenses are designed specifically for patients with presbyopia and are available in both soft and rigid varieties. Toric contact lenses are designed specifically for patients with astigmatism and are also available in both soft and rigid varieties. Combination lenses combining different aspects of the above are also available, for example, hybrid contact lenses.

It is important to note that the asymmetric lens design of the present invention may be incorporated into any number of different contact lenses formed from any number of materials. Specifically, the asymmetric lens design of the present invention may be utilized in any of the contact lenses described herein, including, daily wear soft contact lenses, rigid gas permeable contact lenses, bifocal contact lenses, toric contact lenses and hybrid contact lenses. In addition, although the invention is described with respect to contact lenses, it is important to note that the concept of the present invention may be utilized in spectacle lenses, intraocular lenses, corneal inlays and onlays.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. An ophthalmic lens for at least one of slowing, retarding or preventing myopia progression, the ophthalmic lens comprising:
    an optic zone configured with a positive asymmetric aberration for creating a physiological effect on the eye, the positive asymmetric aberration including asymmetric radial power profiles with increasing dioptric power from a center to a margin of the optic zone and wherein the asymmetric radial power profiles are variable along different radial meridians and are adjustable based upon pupil size to achieve significant increase in effective add power while maintaining reasonably good foveal correction due to the fact that visual acuity is less sensitive to asymmetric aberration; and
    a peripheral zone surrounding the optic zone.

2. The ophthalmic lens for at least one of slowing, retarding or preventing myopia progression according to claim 1, wherein the ophthalmic lenses comprises a contact lens.

3. The ophthalmic lens for at least one of slowing, retarding or preventing myopia progression according to claim 1, wherein the ophthalmic lenses comprises a spectacle lens.

4. The ophthalmic lens for at least one of slowing, retarding or preventing myopia progression according to claim 1, wherein the peripheral zone comprises one or more stabilization mechanisms.

5. The ophthalmic lens for at least one of slowing, retarding or preventing myopia progression according to claim 1, wherein the asymmetric radial power profiles may be rotated by an angle corresponding to a desired directional dominance of a visual scene.

6. The ophthalmic lens for at least one of slowing, retarding or preventing myopia progression according to claim 1, wherein the optic zone comprises a diameter in the range from about 2 mm to about 11 mm.

7. A method for at least one of slowing, retarding or preventing myopia progression by altering the focus of the eye by a direction and degree to alter the growth of the eye, the method comprising introducing asymmetric radial power profiles with increasing dioptric power from a center to a margin of an optical zone of an ophthalmic lens and varying the asymmetric radial power profiles along different radial meridians wherein the asymmetric radial power profiles are adjustable based upon pupil size to achieve significant increase in effective add power while maintaining reasonably good foveal correction due to the fact that visual acuity is less sensitive to asymmetric aberration.

8. The method for at least one of slowing, retarding or preventing myopia progression by altering the focus of the eye by a direction and degree to alter the growth of the eye according to claim 7, wherein the asymmetric radial power profiles are rotatable by an angle corresponding to a desired directional dominance of a visual scene.

9. The method for at least one of slowing, retarding or preventing myopia progression by altering the focus of the eye by a direction and degree to alter the growth of the eye according to claim 7, further comprising adding one or more stabilization zones into a peripheral zone of the ophthalmic lens.

10. An ophthalmic lens for at least one of slowing, retarding or preventing myopia progression, the ophthalmic lens comprising:
    an optic zone configured with a positive asymmetric aberration for creating a physiological effect on the eye, the positive asymmetric aberration including asymmetric radial power profiles with increasing dioptric power from a center to a margin of the optic zone and wherein the asymmetric radial power profiles are variable along different radial meridians; and
    a peripheral zone surrounding the optic zone, wherein the dioptric power from a center to a margin of the optic zone is in the range from about 0.5 D to about 2.5 D.

* * * * *